Dec. 24, 1968    J. A. WILLIAMSON    3,418,649

INTRUDER DETECTION SYSTEM

Filed Feb. 18, 1966    2 Sheets-Sheet 1

INVENTOR.
JAMES A. WILLIAMSON

BY Christensen, Sanborn & Matthews

ATTORNEYS

United States Patent Office 3,418,649
Patented Dec. 24, 1968

3,418,649
INTRUDER DETECTION SYSTEM
James A. Williamson, Corvallis, Oreg., assignor to The Boeing Company, Seattle, Wash., a corporation of Delaware
Filed Feb. 18, 1966, Ser. No. 528,654
9 Claims. (Cl. 340—258)

The present invention relates to intruder detection systems and more particularly to an improved system including alarm means to provide upper fail-safe, countermeasure, threshold, lower fail-safe, and bi-polar intrusion detection capability.

Intruder detection systems are well known and widely used at the present time at military and industrial sites. In such systems it is common practice to make use of radar techniques wherein the passage of an object between an RF transmitter and a receiver will cause a disruption of the balanced signal normally received absent such objects. Thus an indication can be provided when an object, such as a person, is passing through the RF field of the transmitter. In such systems it would be advantageous to have the entire detection chain within a "fail-safe loop" such that the entire system was in continuous self-test. Thus the usual manual tests to determine whether or not the system is in operation and whether or not the same is operating properly could be eliminated. In addition, it would be advantageous to not only satisfy the above requirements but also to accomplish the same with a simplified circuit arrangement which would automatically compensate for system degradation.

Thus it is an object of the present invention to provide an improved intruder detection system which includes a unified alarm logic system. A further object of the present invention is to provide an improved and simplified intruder detection system making use of simplified logic networks to provide the advantageous results noted above. Another object of the present invention is to provide a simplified alarm logic network for use in an intruder detection system whereby the entire system is in continuous self-test and wherein detection threshold functions and compensation for system degradation are obtained.

The above as well as additional advantages and objects of the present invention are achieved through the use of a simplified logic network wherein the information signals demodulated by an RF receiver are simultaneously applied to a square-wave generating circuit having a hysteresis function, such as a Schmitt trigger circuit, and to an AC–DC converter. The output circuit from the Schmitt trigger circuit is also applied to a second AC–DC converter. The hysteresis of the Schmitt trigger circuit is established such that so long as the amplitude of the received signal is greater than the hysteresis value and does not become unbalanced due to the presence of an intruder, the output voltage from the converter connected to the Schmitt trigger circuit will remain substantially constant. When an intruder enters the field established by the RF transmitter a shift occurs in the signal applied to the input of the Schmitt trigger circuit so that the applied signal no longer causes repeated triggering of the trigger circuit. An alarm detector and indicating circuit is coupled with the converter, and in one embodiment the operating potential for the alarm detector and indicating network is derived directly from the AC–DC converter. Thus if the voltage from the second converter falls below a predetermined threshold an indication is provided. The system is based on a fail-safe principle so that if the Schmitt trigger circuit does not receive the required lower limit signal the indicating network is not provided with sufficient operating potential and an alarm is provided.

The first AC–DC converter connected directly to the output of the RF receiver is similarly coupled with the alarm detector and indicating network but with the voltage thereof being reversed as compared to the output voltage from the converter coupled with the Schmitt trigger circuit. The arrangement is such that if the amplitude of the output signal from the RF receiver exceeds a certain threshold value, as would be the case upon receipt of an enemy countermeasure signal, then the voltage of opposite polarity provided by the converter will cause the alarm detector and indicating network to be activated. In one specific embodiment of the invention voltage doubling and filtering networks are used as the AC–DC converters.

The above as well as additional advantages and objects of the present invention will be more clearly understood from the following description when read with reference to the accompanying drawings and wherein, FIGURE 1 is a block diagram of one preferred embodiment of the invention.

Figure 1:
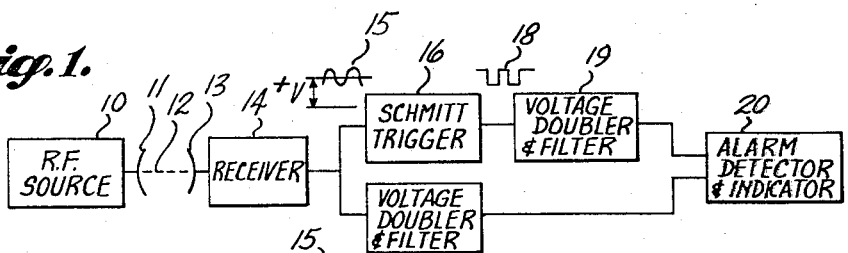

Referring now to the drawings and in particular to FIGURE 1, an improved intruder detection system provided in accordance with the present invention is illustrated in block diagram form. The system includes a radio frequency source 10 having an output antenna 11 directing a beam of RF energy 12 toward the antenna 13 associated with the RF receiver 14. In practice a low frequency signal modulates the radio frequency signal with the receiver 14 serving to demodulate the received signal and apply the same as signal 15 to the trigger circuit 16 and to the AC–DC converter shown as a voltage doubler and filter network 17. Signal 15 is a fixed amplitude AC signal rising at the DC bias level. In the embodiment of FIGURE 1, a Schmitt trigger circuit 16 is adapted to respond to signal 15 and provide a square-wave signal 18 to a second AC–DC converter illustrated as a voltage doubler and filter network 19. The output circuits of the two voltage doublers 17 and 19 are coupled to an alarm detector and indicating network 20. The network 20 is so constructed that if it does not receive a signal from the voltage doubler and filter network 19, or if it does receive a signal from the voltage doubler and filter network 17, a visual or audio indicator is activated.

As described in greater detail hereinafter, the Schmitt trigger circuit 16 is appropriately biased so that it will provide square-wave pulses to the voltage doubler and filter 19 so long as the signal 15 applied thereto alternately passes through the two hysteresis thresholds for the Schmitt trigger circuit. So long as this occurs, the voltage doubler and filter network 19 will provide an output direct current of substantially constant amplitude to the detector and indicating network 20. If a foreign objecet enters or is removed from the path between antennas 11 and 13, a shift will occur in the signal 15 applied to the Schmitt trigger circuit 16 so that repeated triggering of the Schmitt circuit discontinues. The DC operating potential for the alarm detector and indicating network 20 is then no longer provided by circuit 19 and an alarm is provided. In a similar manner if the signal level of the signals received by receiver 14 drops below a predetermined threshold value, then the voltage doubler and filter network 19 will no longer provide the required operating potential for the alarm detector and indicating network 20 and a continuous alarm will be provided.

The voltage doubler and filter network 17 is adapted to provide an alarm signal to the network 20 in the event the amplitude of the signal 15 applied thereto exceeds a predetermined threshold. Such would be the case in the event countermeasure efforts were attempted by someone seeking to gain admission to the area being protected by the system. During normal operation (that is absent countermeasure tactics) the voltage doubler and filter networwk 17 does not affect operation of the alarm and indicating circuit 20.

Figure 2:
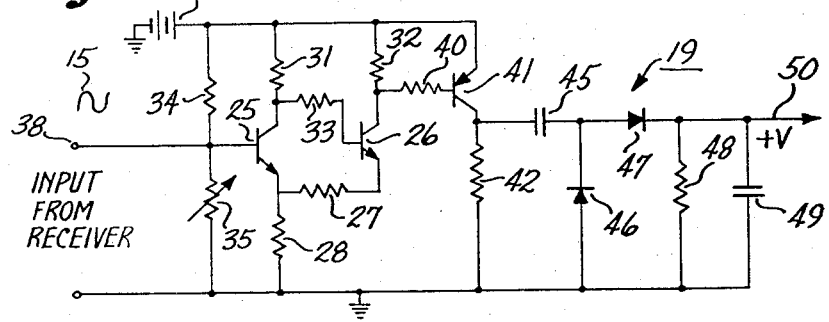
FIGURE 2 is a schematic circuit diagram of the trigger circuit and voltage doubling network included in the block diagram of FIGURE 1.

Referring now to FIGURE 2, there is shown in greater detail a schematic circuit diagram of the Schmitt trigger circuit and voltage doubling and filter network 19 of FIGURE 1. The Schmitt trigger circuit is of conventional form and includes the NPN transistors 25 and 26 having their emitters interconnected by the resistor 27 and with the emitter of transistor 25 being connected by resistor 28 to the point of common reference potential referred to as signal ground. Operating potential is provided by the battery 29 which is connected to the collectors of transistors 25 and 26 by the collector resistors 31 and 32. A bias receiver 33 is connected between the collector of transistor 25 and the base of transistor 26. A voltage divider network is provided by resistors 34 and 35 with the junction of the two being connected to the base of transistors 25 and serving to establish the initial operating condition of the circuit. It may be advantageous to introduce the DC bias level for the Schmitt circuit at an earlier point in the system, as for example in the receiver 14. In either case the signal applied to the base of transistor 25 is a fixed AC signal riding on a DC bias which undergoes upward (positive) and downward (negative) shifts due to an intruder entering the RF field. That is, the change produced when an intruder enters the field is similar to that which would be produced by slowly varying resistor 35.

Figure 5:
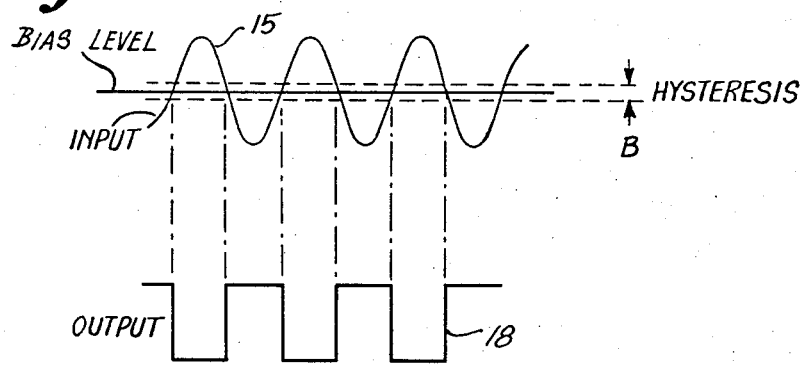
FIGURE 5 is a diagram of input and output signals applied to and derived from the Schmitt trigger circuit of FIGURE 1.

The DC bias applied to the tranistor 25 is set midway between the two triggering levels for the Schmitt circuit. When the signal input terminal 38 receives the alternating signal 15 in the absence of an intruder the base of transistor 25 is first driven positive by a certain extent so that transistor 25 is conductive and is then driven negative so that transistor 26 is conductive. As is typical in the case of Schmitt trigger circuits, the transistor 25 after having been rendered conductive remains conductive and the transistor 26 remains nonconductive even though the level of the signal 15 is reduced to a point below the initial signal which caused the transistor 25 to conduct. When the potential of the signal applied to base 25 is further reduced the states of conduction reverse. This will be seen more clearly from the wave-forms of FIGURE 5. In the circuit of FIGURE 2 the collector of transistor 26 is coupled by resistor 40 to the base of PNP transistor 41 which has its emitter connected to the positive terminal of power supply 29 and its collector connected to ground through resistor 42. The arrangement is such that as long as the base of transistor 25 is repeatedly driven above and below the hysteresis voltage levels on either side of the DC bias level, the voltage on the collector of transistor 41 will undergo square-wave excursions as indicated by the wave-form 18.

Figure 3:
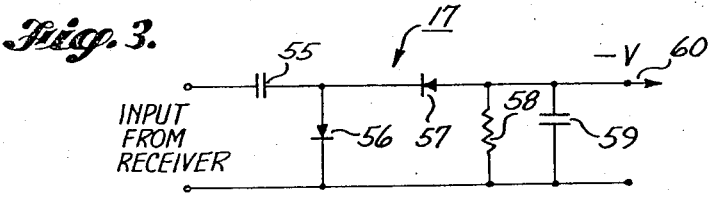
FIGURE 3 is a schematic circuit diagram of a voltage doubling and filter network adapted for use in the system of FIGURE 1.

The capacitor 45 of the voltage doubling and filtering network 19 is connected to the collector of transistor 41. Diodes 46 and 47 together with resistor 48 and the capacitor 49 make up the remainder of the voltage doubling and filtering network in a circuit arrangement which is well known in the art. As long as the transistor 41 is repeatedly turned on and off the output terminal 50 is maintained at a positive DC potential which is sufficient to operate the alarm detector in the manner shown in FIGURE 4. The network 17 of FIGURE 3 made up of the capacitors 55 and 59, diodes 56 and 57, and resistor 58 is substantially identical to the network 19 with the exception that the output terminal 60 of the circuit of FIGURE 3 becomes negative in response to applied input signals 15.

Figure 4:
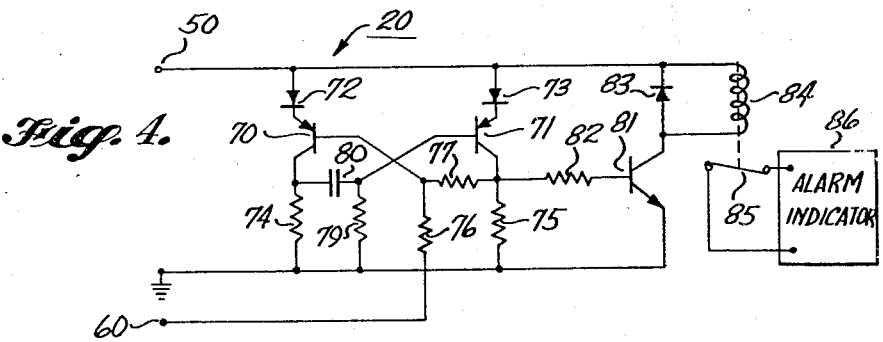
FIGURE 4 is a schematic circuit diagram responsive to the signals of the circuits of FIGURES 2 and 3 and corresponding to the alarm detector and indicating network of FIGURE 1.

In FIGURE 4 a schematic circuit diagram of one preferred type of alarm detector and indicator network 20 is shown. The circuit includes PNP transistors 70 and 71 having their emitters connected respectively through diodes 72 and 73 to the output terminal 50 of the voltage doubler and filter network 19. The collectors are respectively connected to common ground through the collector load resistors 74 and 75. The base of transistor 70 is connected through resistor 76 to the output terminal 60 of the first voltage doubler and filter network 17 and also through the resistor 77 to the collector of transistor 71. The base of transistor 71 is grounded through resistor 79 and is also coupled with the collector of transistor 70 by the capacitor 80. The arrangement is such that transistor 71 is normally conductive so long as operating potential is provided to the terminal 50 from the circuit 19 and the input terminal 60 is not provided with an over riding negative signal from the network 17. A third transistor 81 has its base coupled by the resistor 82 to the collector of transistor 71 and its emitter circuit connected directly to signal ground. The collector of transistor 81 is connected to terminal 50 by relay winding 84 having a protection diode 83 connected thereacross. Transistor 81 is normally conductive and therefore the contacts 85 controlled by the hold-in winding 84 are normally closed. The alarm indicator 86 is held disabled by the contacts 85 being closed. It will be seen that if sufficient operating potential is not provided to the terminal 50 the winding 84 will be de-energized, and similarly it will be seen that even though contact 50 is provided with operating potential the occurrence of an overriding negative signal on terminal 60 will render transistor 70 conductive. This in turn causes transistors 71 and 81 to become nonconductive and hence cause contacts 85 to open. The alarm indicator 86 can be any of a number known in the art, as for example a flasher and/or an audio alarm rendered operative by the opening of contacts 85.

Figure 6:
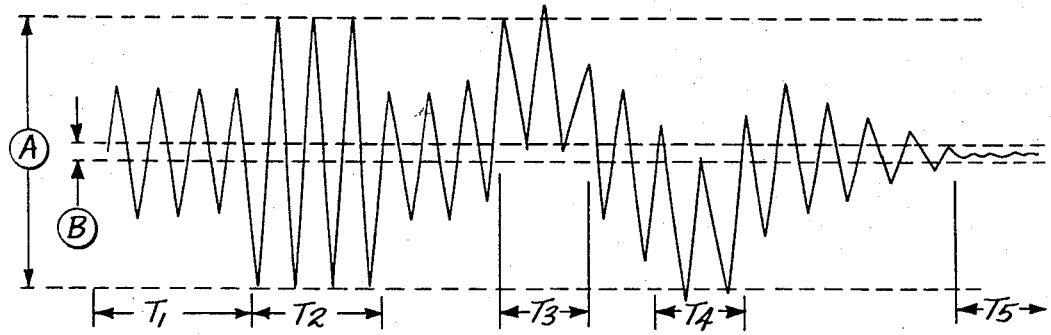
FIGURE 6 is an illustration of the form of signal typically provided by the RF receiver to the unified alarm network in the system of FIGURE 1.

Referring now to FIGURE 6, there is shown for purpose of illustration a typical signal wave-form corresponding to the signal 15 applied to the Schmitt trigger circuit 16. It is assumed that the bais for the Schmitt trigger circuit is such that the circuit has a hysteresis indicated by the reference letter B and also that the signal strength corresponding to enemy counter-measures (ECM) is established as A. It will be seen that during the time interval $T_1$ when there is no system intrusion the input signal 15 repeatedly passes through the upper and lower threshold values for triggering of the Schmitt trigger circuit. Thus the voltage doubler and filter network 19 will provide the necessary operating potential on the terminal 50 for holding the contacts 85 closed. During time interval $T_2$ it is assumed the enemy counter measures are being attempted and thus the strength of the input signal 15 has materially increased to the point such that the voltage doubler and filter network 17 provides an increased negative signal to the terminal 60 causing transistor 72 to conduct and transistors 71 and 81 to become nonconductive. Thus the contacts 85 open in the manner described above.

During time $T_3$ it is assumed an intruder has entered the RF field and therefore even though the AC component of the receiver output signal remains constant the DC level of the base of transistor 25 is shifted upwardly to the point such that the AC signal does not repeatedly pass through the required triggering levels for the Schmitt trigger circuit. Therefore the Schmitt trigger circuit remains in one or the other of its states and square-wave signals 18 to network 19 are no longer continued. Thus the required operating potential for preventing an alarm by the alarm circuitry 20 is no longer present. Similarly during the time interval $T_4$ the Schmitt trigger circuit is not operated due to downward shift of the signal level caused by an intruder, and an alarm is provided. The upward and downward shifts in the DC bias of transistor 25 due to the presence of an intruder is referred to as positive and negative intrusion. Actually as an intruder enters and moves through the field both positive and negative changes occur in the DC level of the base of transistor 25, as will be seen from FIGURE 6.

During the time between time intervals $T_4$ and $T_5$ it will be seen that the amplitude of the signal 15 is decreasing and yet the signal strength is sufficient to cause repeated triggering of the Schmitt trigger circuit. In the system of the present invention the system sensitivity increases as the signal strength decreases. That is, if the peak to peak fail-safe signal is established as $V_{f/s}$ volts, and the hysteresis of the Schmitt trigger circuit is $V_h$ volts, then the required shift upward or downward of the input signal due to an intrusion to create an alarm is $$\frac{V_{f/s} - V_h}{2} \text{ volts}$$

When the system degrades to 50% of its normal sensitivity the required intrusion signal will only be approximately one half of that previously required. Thus as the system gain decreases the system sensitivity increases until the point is reached where the system sensitivity is so great that the system is in constant alarm. This is illustrated in FIGURE 6 during the time interval $T_5$ when the system is in constant alarm.

There has been disclosed an improved intruder detection system and in particular an improved unified alarm logic network for use in intruder detection systems. While the invention has been disclosed by reference to specific embodiments it is of course to be understood that the same has been done to facilitate teaching the invention and that the following claims are to encompass those modifications which become obvious to a person skilled in the art as a result of the teachings hereof.

What is claimed is:

1. An alarm network for an intruder detection system comprising: radio frequency receiver means; a trigger circuit coupled with said receiver means and having a hysteresis characteristic; a first A.C.–D.C. converter coupled with said trigger circuit providing a first signal in response to alternating signals of opposite polarity from said trigger circuit; a second A.C.–D.C. converter coupled with said receiver means and providing a second signal when the amplitude of the output signals from said receiver are greater than a predetermined threshold value; and alarm means coupled with each of said converters and responsive to the presence of said second signal or the absence of said first signal to provide an alarm.

2. A system as defined in claim 1 wherein said alarm means includes: relay circuit means coupled with said first converter, and circuit means coupled with said second converter and with said relay circuit means for changing the condition of said relay circuit means in response to a said second signal from said second converter.

3. A system as defined in claim 1 wherein said trigger circuit is a Schmitt trigger circuit.

4. A system as defined in claim 1 wherein each said converter is a voltage doubler and filter.

5. A system as defined in claim 1 wherein said alarm detector and indicator network includes: a relay coupled with said first converter and having a first set of contacts which are normally closed during the presence of said first signals; current control means in series circuit with said relay winding and coupled with said second converter and adapted to be rendered nonconductive in response to said second signals; and alarm indicator means having said relay contacts connected in control arrangement therewith such that said alarm indicator is activated in response to the opening of said contacts.

6. An intruder detection system comprising in combination: a radio frequency transmitter; a radio frequency receiver including means for receiving signals from said transmitter; a signal shaping circuit coupled with the output of said receiver for providing rectangular output signals so long as the amplitude of the output signals from said receiver repeatedly passes through first and second voltage levels; first and second alternating current-to-direct current converters respectively coupled with said signal shaping circuit and with said receiver and each adapted to provide a unidirectional output signal in response to input signals thereto; and an alarm detector and indicating network coupled with each of said converters and responsive to a first signal from said second converter or the absence of a signal from said first converter to provide an alarm.

7. A system as defined in claim 6 where said signal shaping circuit is a Schmitt trigger circuit.

8. A system as defined in claim 6 wherein said converters comprise voltage increasing circuits coupled in opposite polarity to said network.

9. A system as defined in claim 6 wherein said network includes a monostable multivibrator coupled with said first converter for the receipt of operating potential therefrom and with said second converter for the receipt of triggering signals, and alarm circuit means coupled with said multivibrator and responsive to the condition thereof to provide an alarm when said multivibrator is triggered from its stable condition.

References Cited

UNITED STATES PATENTS

| | | |
|---|---|---|
| 2,234,011 | 3/1941 | Shepard. |
| 2,302,271 | 11/1942 | Smith. |
| 2,649,538 | 8/1953 | Marlowe et al. ____ 340—224 X |
| 2,826,753 | 12/1961 | Chapin _____ 340—258 |
| 3,149,243 | 9/1964 | Garfield. |
| 3,237,105 | 2/1966 | Kalmus _____ 340—258 |
| 3,270,339 | 8/1966 | McEuen et al. ____ 340—258 X |

JOHN W. CALDWELL, *Primary Examiner.*

D. L. TRAFTON, *Assistant Examiner.*